G. R. BURT.
Land-Roller.
No. 69,175.                                           Patented Sept. 24, 1867.
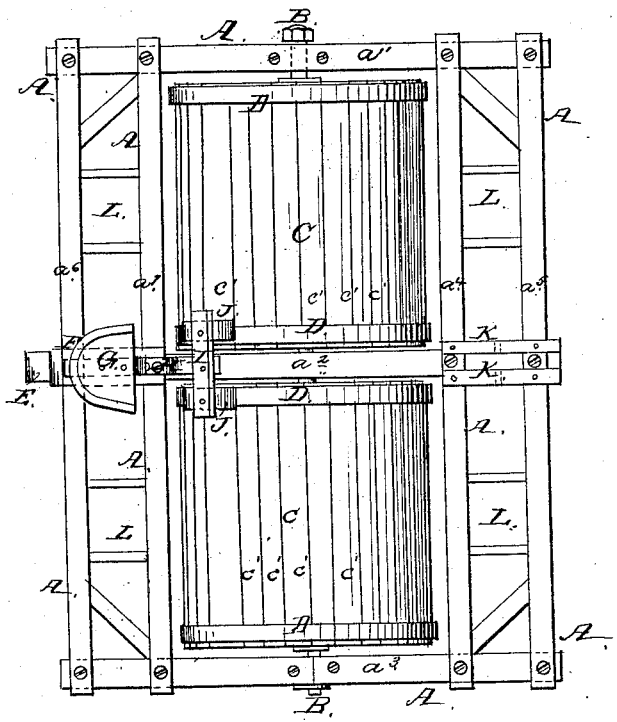
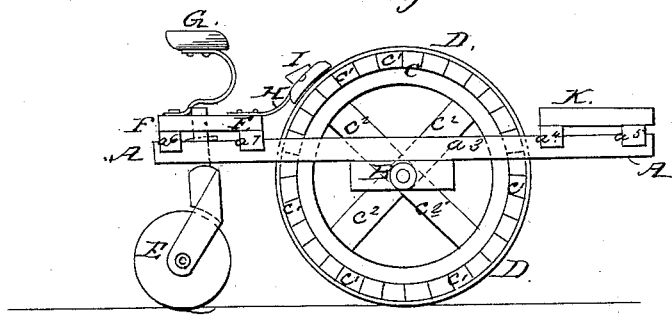
WITNESSES:                                      INVENTOR:

United States Patent Office.

GEORGE R. BURT, OF PERRY, NEW YORK.

Letters Patent No. 69,175, dated September 24, 1867.

---

IMPROVEMENT IN LAND-ROLLERS.

---

The Schedule referred to in these Letters Patent and making part of the same.

---

TO ALL WHOM IT MAY CONCERN:

Be it known that I, GEORGE R. BURT, of Perry, in the county of Wyoming, and State of New York, have invented a new and useful Improvement in Land-Rollers; and I do hereby declare that the following is a full, clear, and exact description thereof, which will enable others skilled in the art to make and use the same, reference being had to the accompanying drawings, forming part of this specification, in which—

Figure 1 is a top or plan view of my improved roller.

Figure 2 is an end view of the same.

Similar letters of reference indicate like parts.

My invention has for its object to so improve the construction of land-rollers as to make them more convenient and effective in operation; and it consists in the construction, combination, and arrangement of the frame, shaft, and cylinders with each other, in the combination of the caster-roller with the frame of the machine, in the combination of the spring-brake with the frame of the driver's seat, and in the manner in which the tongue is attached to the frame.

A is the frame of the roller, which is made with three cross-bars $a^1$, $a^2$, and $a^3$, one at each end and one at the centre. To the forward ends of the cross-bars $a^1$, $a^2$, and $a^3$, are secured two longitudinal bars $a^4$ and $a^5$, at a little distance from each other, and connected to each other by cross and brace-bars, as shown in fig. 1. To the rear ends of the cross-bars $a^1$, $a^2$, and $a^3$, are attached two longitudinal bars $a^6$ and $a^7$, connected to each other by cross and brace-bars, as shown in fig. 1. B is the roller shaft, which extends from end to end of the frame A, and revolves in bearings in the middle parts of the cross-bars $a^1$ $a^2$ and $a^3$. C are the cylinders, which are formed by attaching timbers $c^1$, made in the proper form, to wheels $c^2$, attached to the shaft B between the cross-pieces $a^1$ and $a^2$, and between the pieces $a^2$ and $a^3$, as shown in figs. 1 and 2. The cylinders C are further strengthened by iron bands D, placed upon their ends, firmly binding the timbers $c^1$ to the wheels $c^2$. E is a caster-roller, pivoted to the rear part of the frame A, in such a position as to roll the ground left unrolled between the inner ends of the cylinders C. F is the seat-frame, attached to the rear part of the frame A, and to which the seat G is attached. To the forward part of the frame F is attached one end of a spring, H, the other end of which extends upward and forward, and has a cross-bar, I, attached to it, to the ends of which are attached the brake-shoes J, the bar I being of such a length that one of the said brake-shoes may act upon one cylinder, and the other upon the other. The brake is applied by the driver pressing upon the bar I with his feet. To the front part of the frame A, directly over the cross-bar $a^2$, are attached two cross-bars K, between which is pivoted the tongue by which the roller is drawn and guided. L are boxes formed upon the frame A, between the bars $a^4$ and $a^5$, and between the bars $a^6$ and $a^7$, into which stones or other heavy material may be put to regulate the pressure of the roller.

What I claim as new, and desire to secure by Letters Patent, is—

1. The rollers C when provided with the flanges or bands D, upon the inner ones of which the brakes J bear, as herein set forth for the purpose specified.

2. The caster-roller E in combination with the roller C, flanges or rims D, and brakes J, as herein shown and described.

3. The combination of the spring-brake H I J with the seat-frame F, and cylinders C, substantially as herein shown and described and for the purpose set forth.

4. The rollers C C when suspended from the same shaft B, beneath the frame A, constructed as herein described.

GEORGE R. BURT.

Witnesses:
JOHN C. BLYTHE,
DANIEL WESTLAKE.